July 8, 1969      L. SPRUYT      3,454,441

PROCESS FOR THE INDUSTRIAL FABRICATION OF PLASTIC BAGS

Filed Jan. 5, 1966

INVENTOR.

L. Spruyt

BY Richards & Geier

ATTORNEYS

United States Patent Office 3,454,441
Patented July 8, 1969

3,454,441
PROCESS FOR THE INDUSTRIAL FABRICATION
OF PLASTIC BAGS
Leo Spruyt, 4 Joos Robijnslei, Borgerhout-
Antwerp, Belgium
Filed Jan. 5, 1966, Ser. No. 518,833
Claims priority, application Belgium, Jan. 12, 1965,
658,159
Int. Cl. B32b 31/18
U.S. Cl. 156—244                                          2 Claims

ABSTRACT OF THE DISCLOSURE

This invention relates to a process for making a bag which is reinforced both at the level of its gripping element and over its entire height. The starting point is a sheath comprising a diametrically opposed reinforcing strip, the sheath being laid flat so that the reinforcing strips are superimposed. The sheath processed in this way is cut along equidistant lines, the bottoms sealed, and finally, the free edges of the bag having thus been reinforced are cut off said reinforcing strip and in the underlying part of the sheath.

---

The present invention concerns the industrial fabrication, preferably on a very large scale, by extrusion of a continuous sheath or foil of plastics, of bags more generally of the type known as shopping bags fitted with handles. One of the objects of the present invention is to produce a special bag element starting from such an extruded sheath of plastics, an element making it possible to produce various kinds of bags according to the relative positions of the reinforced zones of the finished bag.

A novel industrial process of this invention substantially consists in fastening onto an extruded sheath at least one longitudinal band of a reinforcing material; in cutting said sheath to lengths in the known way; in sealing the edges as the bag is being formed, and in cutting the part corresponding to the gripping element in both superimposed pleats, respectively the four thicknesses of material.

This process is such that the successive operations which determine the complete operational cycle can be carried out by quick acting automatic means resulting in a very fast production of such bags, despite their apparently complex operation.

The order of the various phases of this new operational system can naturally be varied according to the types of bags which must be made. In this respect, concerning the special bag element which forms one of the major characteristics of the present invention and is, in a way, the actual starting product of the very bag making, it will in general be carried out by means of an extruded sheath of polyethylene or any other thermoplastic substance of appropriate thickness and color, on the outside of which is fastened a strengthening strip, generally of the same material, this special element thus appearing under the form of a sheath which is locally reinforced over a zone extending over its whole length, but of comparatively restricted width, whereof the minimum value will generally be determined by the width of the gripping element required for the bag, mostly in the form of handles.

This reinforcement strip is also of variable thickness. It will be fastened onto a suitable part of the extruded sheath by any known means, but preferably by heat sealing, i.e. by simple application of heat and adequate pressure, all operations well known in the art.

In one preferred form of embodiment of the present invention, the bonding together of said sheath and said reinforcing strip can be carried out at the level of or near the extrusion nozzle.

From the foregoing it is apparent that the special bag element forms, as' such, a novel industrial product starting from which it is possible to make all kinds of bags by means of a sheath, generally an extruded sheath, of plastics, having at least one longitudinal reinforcing strip also made of plastics the color of which shall preferably be different from that of the sheath and forming a support for any previously applied printed subjects, decorations and/or advertising matter.

Starting from this special bag element, it will be possible to make all kinds of bags and more generally bags of the so-called shopping type, according to whether it is wanted to limit the reinforcement zones merely to the free edges of the bag, respectively the gripping element of the latter, or at the same time to said gripping element and to the medium part, but over the whole height of the bag and, consequently, according as to whether a start is made from a sheath with one or two diametrically opposed reinforcing strips.

These various embodiments do not imply any change in the special bag element or in the nature of the subsequent industrial operations.

These differences only concern the situation of the cutting lines of the sheath, respectively the sealing lines.

By way of example, and without having any limitative meaning, some embodiments are described in greater detail below, with reference to the appended drawings, of which FIGURE 1 illustrates as a front view a section of a special bag element according to the present invention, with two reinforcing bands;

In the form of embodiment illustrated in FIGURES 1 to 5, the starting element is the sheath 1, such as an extruded sheath of polyethylene having two reinforcing strips 2-3 diametrically opposed and extending along the length of said sheath. In the present instance, these two reinforcing strips consist of highly resistant polyethylene strips of a color which differs from that of said sheath 1.

This special bag element is cut into sections according to equidistant lines A–B–C–D; then, said sections are bonded along all the lines A–B so as to form the bottoms 4, and finally the superimposed free edges of aforesaid sections are cut so as to form a handle 5 of which the opening is cut out both in said reinforcing strips and the parts of the underlying sheath.

Figure 1:
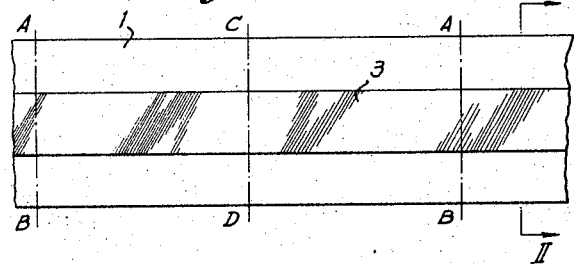
Figure 2:
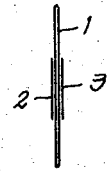
FIGURE 2 represents a cross-section along the straight line II—II of FIGURE 1.
Figure 3:
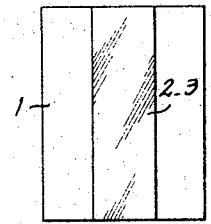
FIGURES 3, 4 and 5 show the three successive phases for making a bag starting from the special element which is shown in FIGURES 1 and 2.
Figure 4:
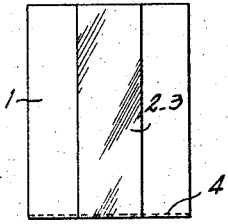
Figure 5:
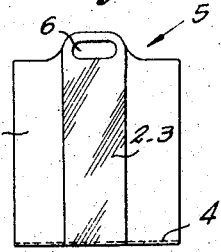

In this way a bag is made such as is summarily represented in FIGURE 5 and of which the capacity will depend on the characteristics of the starting sheath. In this form of embodiment, the handle 5 will offer a very great resistance, in that the traction stresses are distributed over the whole height of the bag which, in turn, is reinforced by the presence of said strips 2–3.

Figure 6:
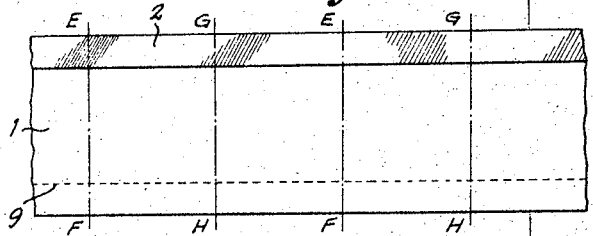
FIGURE 6 illustrates the front view of a section of a special bag element according to the present invention, with one reinforcing strip.
Figure 7:
FIGURE 7 is a cross-section along the straight line VII—VII of FIGURE 6.
Figure 8:
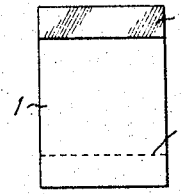
FIGURES 8, 9 and 10 illustrate the three successive phases for making a bag starting from the special element represented in FIGURES 6 and 7.
Figure 9:
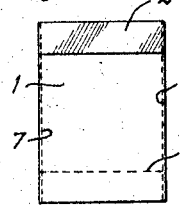
Figure 10:
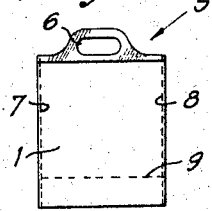

In the embodiment represented by FIGURES 7 to 10, the starting point is a special bag element with a single reinforcing strip. In this particular instance, the sheath 1 comprises one single reinforcing strip 2 for instance under the condition described in the previous example. The sheath is laid out as illustrated in FIGURES 6 and 7 and, subsequently, cut in sections along the equidistant lines E, F, G, H. All that is required next, as shown diagrammatically in FIGURES 8, 9 and 10, is to cut up said special element along the equidistant lines E, F, G, H; then to carry out the lateral sealing lines 7–8 and, finally, to cut the upper free edge of the bag in order to form a gripping element 5 of which the opening 6 is made into said reinforcing strip 2 and the underlying part of the sheath.

In a general way, the present invention will be more economically carried out by starting from such extruded sheath. It is evident however that, for smaller rates of production, the characteristic arrangements disclosed herein could quite well be applied onto sheaths obtained by any other means.

It is also quite evident that the reinforced edges building said gripping means, generally in form of a handle, could possibly be combined with any other kind of closing devices and more particularly those acting by elastic engagement of male and female elements depending respectively from one and from the other free edge of the bag. Likewise, the same means could be applied for reinforcing, if necessary, the edge of the bags as illustrated diagrammatically in broken lines in FIGURES 7 to 10.

The present invention concerns not only the process as such, but also the special bag element as well as any bag whatever resulting from an application of said process by means of said special bag element.

What I claim is:

1. A process for the industrial fabrication of bags of plastics, comprising the steps of fastening onto an extruded sheath at least one longitudinal strip of reinforcing material; cutting said sheath to length, sealing the edges of the bag being formed and cutting the free edges thereof to form a gripping element having an opening formed in aforesaid reinforcing strip and in the part of underlying sheath.

2. A process according to claim 1, wherein in order to make a bag which is reinforced both at the level of its gripping element and over its entire height, the starting point is a sheath comprising at least two diametrically opposed reinforcing strips; the sheath being laid flat in such a way that the reinforcing strips be superimposed; the sheath processed in this way being cut along equidistant lines; the bottoms being sealed and, finally, the free edges of the bag having thus been reinforced are cut off said reinforcing strip and the underlying part of the sheath.

References Cited
UNITED STATES PATENTS

| | | | |
|---|---|---|---|
| 3,302,860 | 2/1967 | Schwarzkopf | 229—54 |
| 3,312,766 | 4/1967 | Stevens | 264—167 X |
| 3,328,220 | 6/1967 | Harding | 156—244 X |

EARL M. BERGERT *Primary Examiner.*

T. R. SAVOIE, *Assistant Examiner.*

U.S. Cl. X.R.

150—1.7; 156—252, 267; 229—54; 264—159